(12) United States Patent
Huang

(10) Patent No.: US 7,403,519 B2
(45) Date of Patent: Jul. 22, 2008

(54) ASYMMETRIC ETHERNET NETWORK DATA TRANSFER SYSTEM AND METHOD

(75) Inventor: Scott Huang, Sindian (TW)

(73) Assignee: Via Technologies Inc., Taipei (TW)

(*) Notice: Subject to any disclaimer, the term of this patent is extended or adjusted under 35 U.S.C. 154(b) by 946 days.

(21) Appl. No.: 10/838,794

(22) Filed: May 4, 2004

(65) Prior Publication Data
US 2005/0249203 A1 Nov. 10, 2005

(51) Int. Cl.
H04L 12/28 (2006.01)

(52) U.S. Cl. ........................ 370/389; 370/400

(58) Field of Classification Search ........ 370/389, 370/400, 408, 409, 401, 390, 392, 393, 396, 370/351, 254; 709/238, 241, 242, 229, 225, 709/321
See application file for complete search history.

(56) References Cited

U.S. PATENT DOCUMENTS 6,868,450 B1 * 3/2005 Lucovsky ................. 709/229

* cited by examiner

Primary Examiner—Chi H. Pham
Assistant Examiner—Alexander Boakye
(74) Attorney, Agent, or Firm—Thomas, Kayden, Horstemeyer & Risley

(57) ABSTRACT

The present invention provides an asymmetric Ethernet network data transfer system and method. The present invention utilizes a network interface card being capable of an automatic transfer mode switch to form an asymmetric network data transfer system, and through which to modify the symmetry feature of the Ethernet and increase the transfer bandwidth.

19 Claims, 7 Drawing Sheets

ASYMMETRIC ETHERNET NETWORK DATA TRANSFER SYSTEM AND METHOD

BACKGROUND OF THE INVENTION

1. Field of the Invention

The present invention is related to a network data transfer system, and more particularly, to an asymmetric Ethernet network data transfer system.

2. Description of the Prior Art

With the quick improvements in technology, the network has become an indispensable communication medium in modern society. Of all the networks, the local area network is the most popular one due to the well-developed and inexpensive devices of it. The Ethernet is a common local-area-network technique. It consists of an Ethernet card and other network connection devices. The conventional Ethernet has a symmetry feature in data transfer, which means that the bandwidths used in the downloading and uploading data transfer works are equal. However, usually the practical downloading and the practical uploading data transfer rates are different. Thus, the symmetry feature often causes congestion problems to data transfer in the transfer direction with insufficient bandwidth and leaves bandwidth unused in the transfer direction with transfer bandwidth more than needed.

Reference is now made to FIG. 1, which is a block diagram illustrating a conventional Ethernet network interface card 100. The conventional Ethernet network interface card 100 comprises: a negotiating module 110 to negotiate with the target network apparatus for the packet format for data transfer; for example, the IP (internet protocol) packet format□ a transforming module 120 to perform the transformation between the digital data (such as the computer terminal) and the packets (such as the network terminal) according to the packet format agreed on; and a transmitting/receiving module 130 which further comprises a transmitting agent 130A and a receiving agent 130B. Take the transmitting agent 130A for example, the main mission of it is to send out the packets from the transforming module 120. The network cable connected to the transmitting agent 130A and the receiving agent 130B are both in one-way transfer mode, i.e. the packets in the network cable connected to the transmitting agent 130A all travel towards a target network apparatus 140A (another apparatus with a network interface card); and the packets in the network cable connected to the receiving agent 130B all travel towards the network interface card 100 itself (or say the packets all travel towards the slot 140B in which the network interface card 100 is set and then into the CPU). Since the physical bandwidth of each network cable is of the same size, in the above case the network interface card 100 practically utilizes the same bandwidth for both the downloading and uploading data transfer works, which is what called the symmetry feature of the Ethernet. However, in real cases the downloading data transfer rate and the uploading data transfer rate usually are not the same. For example, general network end users download more than upload. Thus, while transferring data, the symmetry feature of the Ethernet often causes congestion problems to the data transfer in the transfer direction with insufficient bandwidth and leaves bandwidth unused in the transfer direction with transfer bandwidth more than needed. To solve this problem, the present invention provides an asymmetric Ethernet network data transfer system which can allocate the bandwidth in a more proper manner.

SUMMARY OF THE INVENTION

The present invention is directed towards the above-mentioned need. The present invention provides an asymmetric network data transfer system to solve the problem of impropriate bandwidth allocation caused by the symmetry feature of the Ethernet without substantially changing current network data transfer mechanism and equipment, and though which to correspond to both industrial and economic needs.

The present invention discloses an asymmetric Ethernet network data transfer system and method. The present invention utilizes a network interface card being capable of an automatic transfer mode switch to form an asymmetric data transfer system, and through which to modify the symmetry feature of the Ethernet and increase the transfer bandwidth. To avoid misunderstanding, in this text the word "bandwidth" will be separated by meaning by using "physical bandwidth" to refer to the max bearable data flow rate (the unit is bps: bit per second) of the transfer medium (which will be the network cable herein); and "transfer bandwidth" to refer to the bandwidth actually used during the data transfer process. The word "asymmetric" herein is in connection with the transfer bandwidth. The present invention only modifies some designs within the network interface card, all other current hardware and software used for network data transfer including the network cables need not change. For example, while the specification IEEE 802.3 is used in the network, the asymmetric character of the invention could be archived by modifying the program code Link_Control_[HCD]. Herein, the original concepts at least are "Speed: 10/100/1000; Duplex: Half/Full; FControl: Tx/Rx", and the invention could be archived by adding the new configuration to be new concepts of the program code. Further, one thing should be noticed is that the network cable used must support two-way data transfer, i.e. the network cable must not have the direction feature. For example, the common copper twisted pair like Cat 5 is capable of two-way data transfer, while the optical fiber isn't. Accordingly, the present invention can be easily integrated into current network data transfer framework and can increase network data transfer efficiency with low extra construction cost, which corresponds to the industrial needs.

The present invention provides a network interface card being capable of the one-way/two-way network cable transfer mode switch. The network interface card comprises a negotiating module to negotiate with the target network apparatus for the packet format for data transfer; a transforming module to perform the transformation between the digital data and the packets; a detecting module to detect the network condition (ex: the loading, speed and whether the network interface card of the target network apparatus being capable of the one-way/two-way network cable transfer mode switch); a deciding/switching module to decide whether to perform the one-way/two-way network cable transfer mode switch according to the detecting result from the detecting module: if the answer is positive, the deciding/switching module will perform the one-way/two-way network cable transfer mode switch; if the answer is negative, the deciding/switching module will not perform the one-way/two-way network cable transfer mode switch; and a transmitting/receiving module wherein the transmitting/receiving module comprises a transmitting agent and a receiving agent. The network interface card provided utilizes the deciding/switching module to negotiate with the target network apparatus for the network cable transfer mode for data transfer and to perform the one-way/two-way network cable transfer mode switch, through which to make at least one of the followings happen: the direction of data transfer in the network cable connected to the transmitting agent changes from completely towards the target network apparatus to either towards both the target network apparatus and the network apparatus itself comprising the provided network interface card, or completely towards the network apparatus itself comprising the provided network interface card; and the direction of data transfer in the network cable connected to the receiving agent changes from completely towards the network apparatus itself comprising the provided network interface card to either towards both the network apparatus itself comprising the provided network interface card and the target network apparatus, or completely towards the target network apparatus.

Through the function mentioned above, an asymmetric network data transfer system being capable of real-time adjustments in the ways the two network cables connected to the provided network interface card are used is formed. The asymmetric network data transfer system enables the present invention to improve data transfer efficiency of the Ethernet by real-time switches between symmetric and asymmetric data transfer mechanisms.

The present invention also provides a method for implementing the one-way/two-way network cable transfer mode switch. First of all, the packet format is negotiated by the network apparatus comprising the provided network interface card and the target network apparatus. Then, the network condition (ex: the loading, speed and whether the network interface card of the target network apparatus being capable of the one-way/two-way network cable transfer mode switch) is detected and a decision of whether to perform the one-way/two-way network cable transfer mode switch is made according to the detecting result: if the detecting result shows that the data transfer rate in one of the two network cables exceeds the upper transfer loading limit of that network cable, i.e. the physical bandwidth of that network cable, while there is still unused bandwidth in the other network cable, the one-way/two-way network cable transfer mode switch step will be suggested. Take the transmitting agent for example, the default network cable transfer mode setting is a one-way transfer mode in a direction towards the target network apparatus; the one-way/two-way network cable transfer mode switch step would turn this default setting into a two-way transfer mode towards both the target network apparatus and the network apparatus itself comprising the provided network interface card, or into another one-way transfer mode towards the network apparatus comprising the provided network interface card. On the contrary, if the detecting result shows that neither of the two network cables has transfer rate exceeding the upper transfer loading of it, i.e. the physical bandwidth of it, there will be no need to change the default network cable transfer mode settings and the one-way/two-way network cable transfer mode switch step will not be suggested. It should be noticed that the judging criterion can also be modified as that if the data transfer rate in one of the two network cables exceeds a first proportion of the upper transfer loading limit of that network cable, i.e. the physical bandwidth of that network cable, while there is still unused bandwidth in the other network cable, the one-way/two-way network cable transfer mode switch step will be suggested.

DESCRIPTION OF THE PREFERRED EMBODIMENT

What is probed into in the present invention is an asymmetric Ethernet network data transfer system and method. Detailed descriptions and preferred embodiments of the present invention will now be provided to make the present invention more readily understood. However, well-known elements will not be described herein in order to avoid unnecessary limits. It should also be noticed that the present invention can be practiced in a wide range in addition to those explicitly described herein, and the scope of the present invention is expressly not limited except as specified in the accompanying claims.

Figure 1:
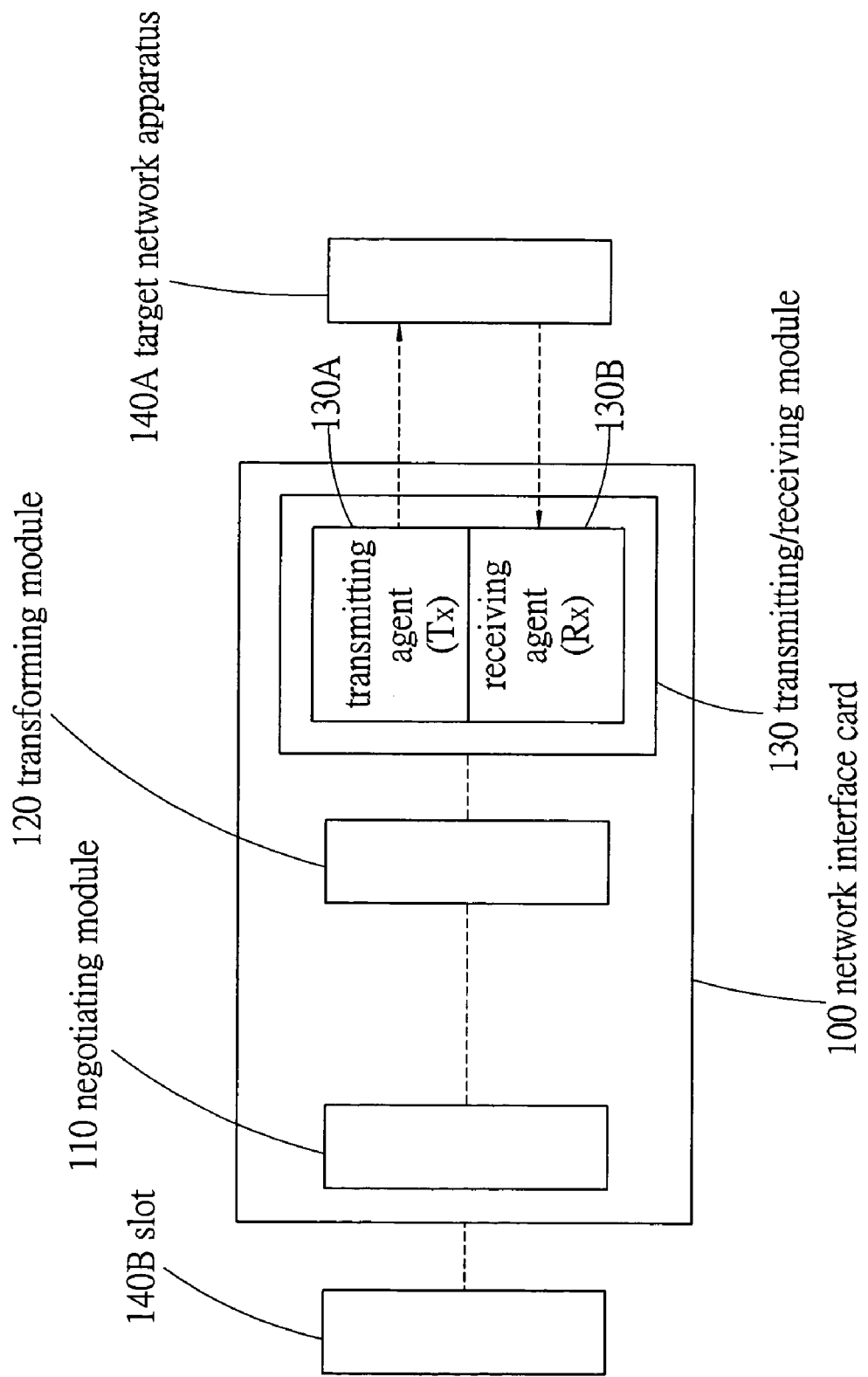
FIG. 1 is a block diagram illustrating a conventional Ethernet network interface card.
Figure 2A:
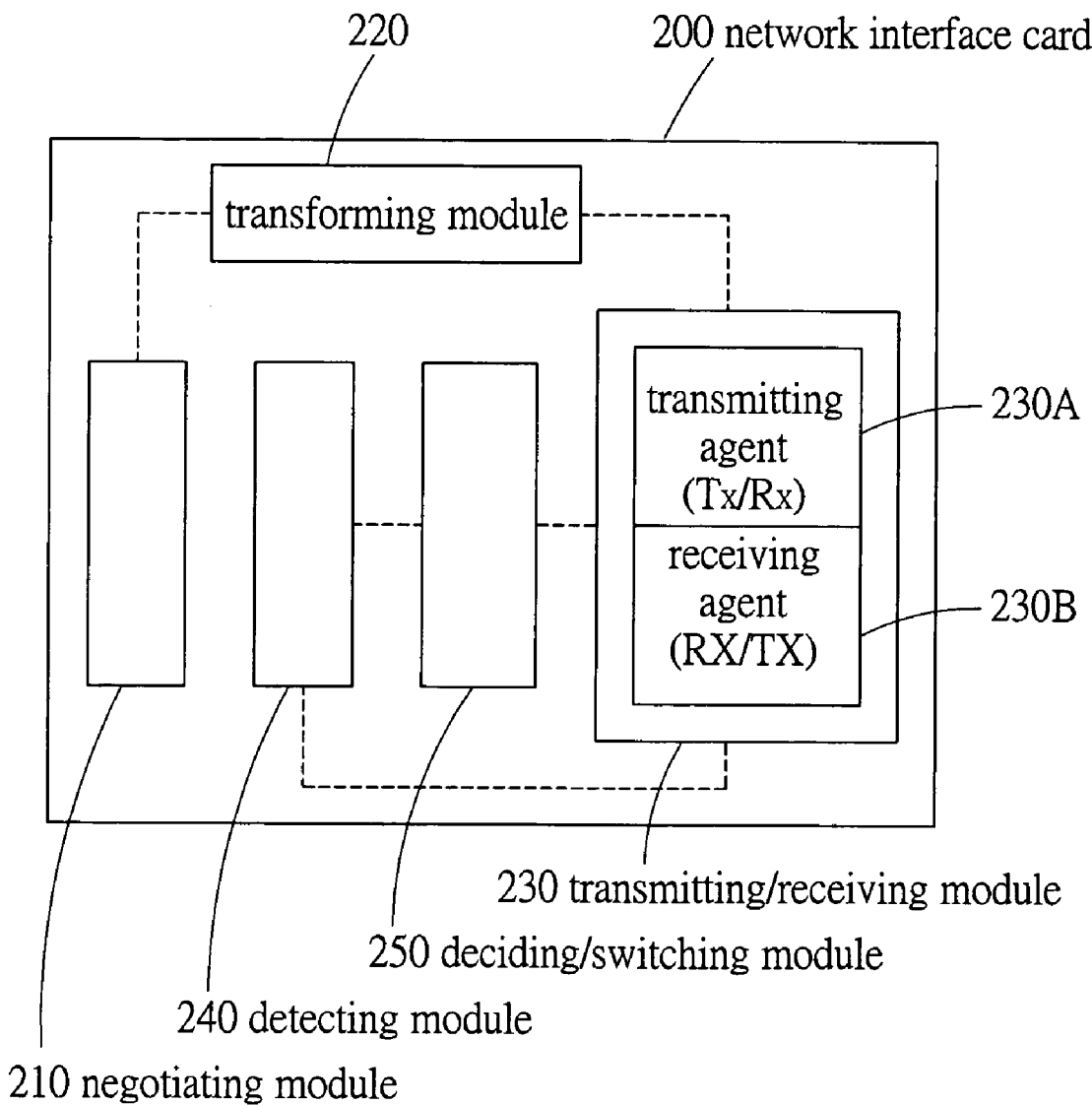
FIG. 2A is a block diagram illustrating a network interface card being capable of the one-way/two-way network cable transfer mode switch in accordance with the first embodiment of the present invention.

Reference is now made to FIG. 2A, in a first embodiment of the present invention, a network interface card 200 being capable of the one-way/two-way network cable transfer mode switch is provided. The network interface card 200 comprises: a negotiating module 210 to negotiate with the target network apparatus for the packet format for data transfer; a transforming module 220 to perform the transformation between the digital data (usually used in the computer) and the packets (usually used in the network) according to the packet format agreed on; a detecting module 240 to detect the network condition (ex: the loading, speed and whether the network interface card of the target network apparatus being capable of the one-way/two-way network cable transfer mode switch); a deciding/switching module 250 to decide whether to perform the one-way/two-way network cable transfer mode switch according to the detecting result from the detecting module 240; and a transmitting/receiving module 230 wherein the transmitting/receiving module 230 comprises a transmitting agent 230A to transmit packet sand a receiving agent 230B to receive packets.

The network interface card 200 utilizes the deciding/switching module 250 to negotiate with the target network apparatus for the network cable transfer mode for data transfer and to perform the one-way/two-way network cable transfer mode switch. This allows the transmitting agent 230A and the receiving agent 230B to has different transfer bandwidths during the data transfer process. For example, when the transfer rate of the transmitting agent 230A or the transfer rate of the receiving agent 230B exceeds the upper transfer loading limit of the network cable connected to it, i.e. the available physical bandwidth of that network cable, or exceeds a specific proportion of the physical bandwidth of that network cable (for example, 70%; this proportion is an adjustable parameter), the way the transmitting agent 230A or the receiving agent 230B works will be modified: the function of the transmitting agent 230A will be turned from the original packet-transmitting into simultaneous packet-transmitting and packet-receiving, or into packet-receiving; the function of the receiving agent 230B will be turned from the original packet-receiving into simultaneous packet-receiving and packet-transmitting, or into packet-transmitting. With the above function, the present invention allows the Ethernet a real-time switch between asymmetric and symmetric data transfer mechanisms.

Figure 2B:
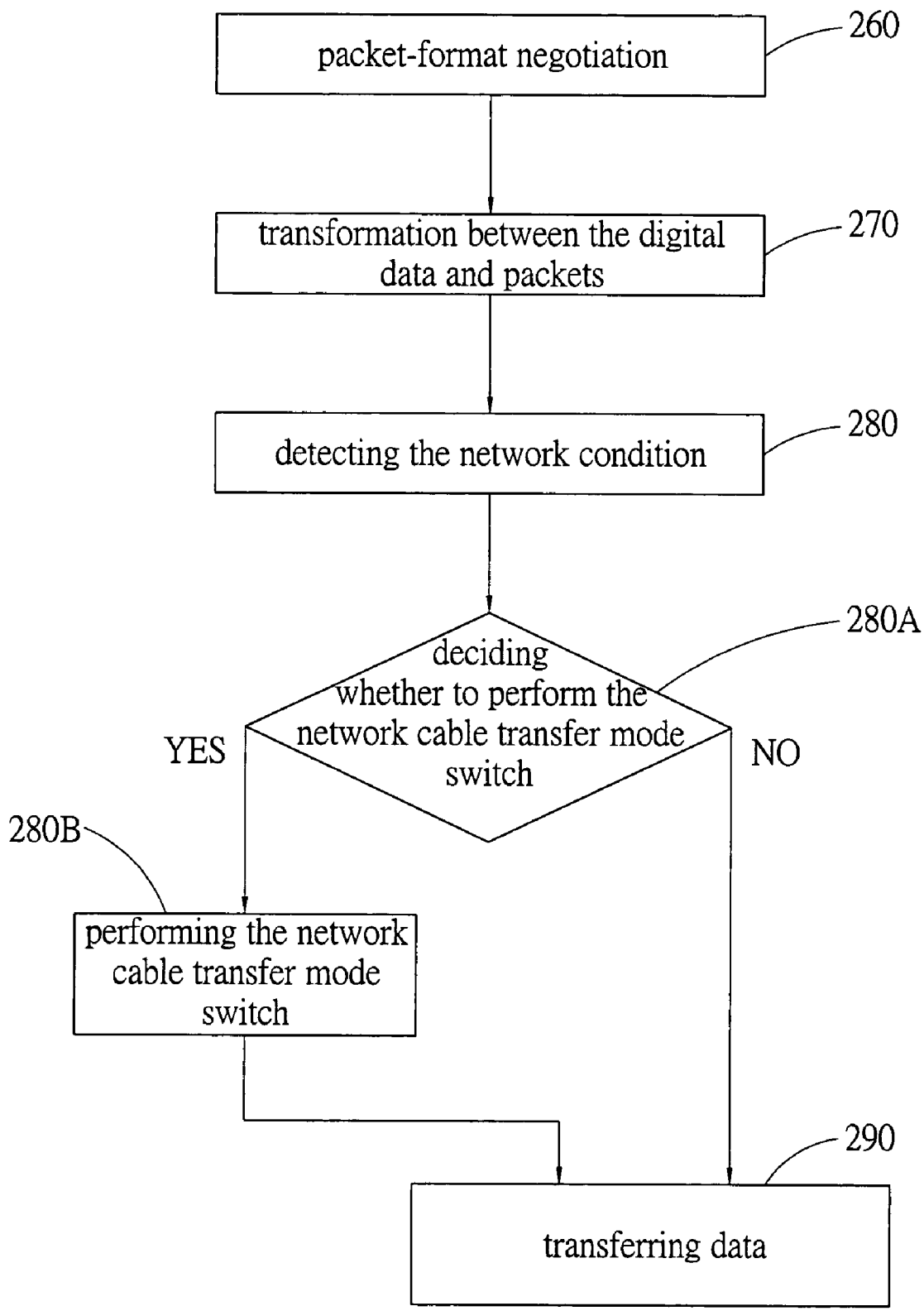
FIG. 2B is a flowchart illustrating the steps of the one-way/two-way network cable transfer mode switch process in the first embodiment of the present invention.

Reference is now made to FIG. 2B, which is a flowchart illustrating the detailed steps of the one-way/two-way network cable transfer mode switch. First of all, the packet format for data transfer is negotiated at step 260 by the network apparatus comprising the provided network interface card and the target network apparatus. Then, transformation between the digital data (such as the computer side) and the packets (such as the network side) is performed at step 270. Afterwards, the network condition (ex: the loading, speed and whether the network interface card of the target network apparatus being capable of the one-way/two-way network cable transfer mode switch) is detected at step 280; then, a decision of whether to perform the one-way/two-way network cable transfer mode switch is made at step 280A according to the detecting result: if the answer is positive, the one-way/two-way network cable transfer mode switch will be performed at step 280B; if the answer is negative, the one-way/two-way network cable transfer mode switch will not be performed. The data transfer work is executed at step 290. The judging criterion for deciding whether to perform the one-way/two-way network cable transfer mode switch briefly is the following: if the transfer rate in one of the two network cables is large or even exceeds the upper transfer loading limit of that network cable, i.e. the physical bandwidth of that network cable, while the transfer rate in the other network cable is small or there is still unused bandwidth in that network cable, the one-way/two-way network cable transfer mode switch will be suggested; on the contrary, if neither of the two network cables has transfer rate exceeding the upper transfer loading of it, i.e. the physical bandwidth of it, there will be no need to change the default transfer mode settings and the one-way/two-way network cable transfer mode switch will not be suggested.

It should be noticed that the judging criterion can also be modified as that if the transfer rate in one of the two network cables exceeds a first proportion of the upper transfer loading limit of that network cable, while the other network cable still has unused bandwidth, the one-way/two-way network cable transfer mode switch will be suggested. Herein, the first proportion could be a predetermined parameter or a dynamically adjusted parameter.

Figure 2C:
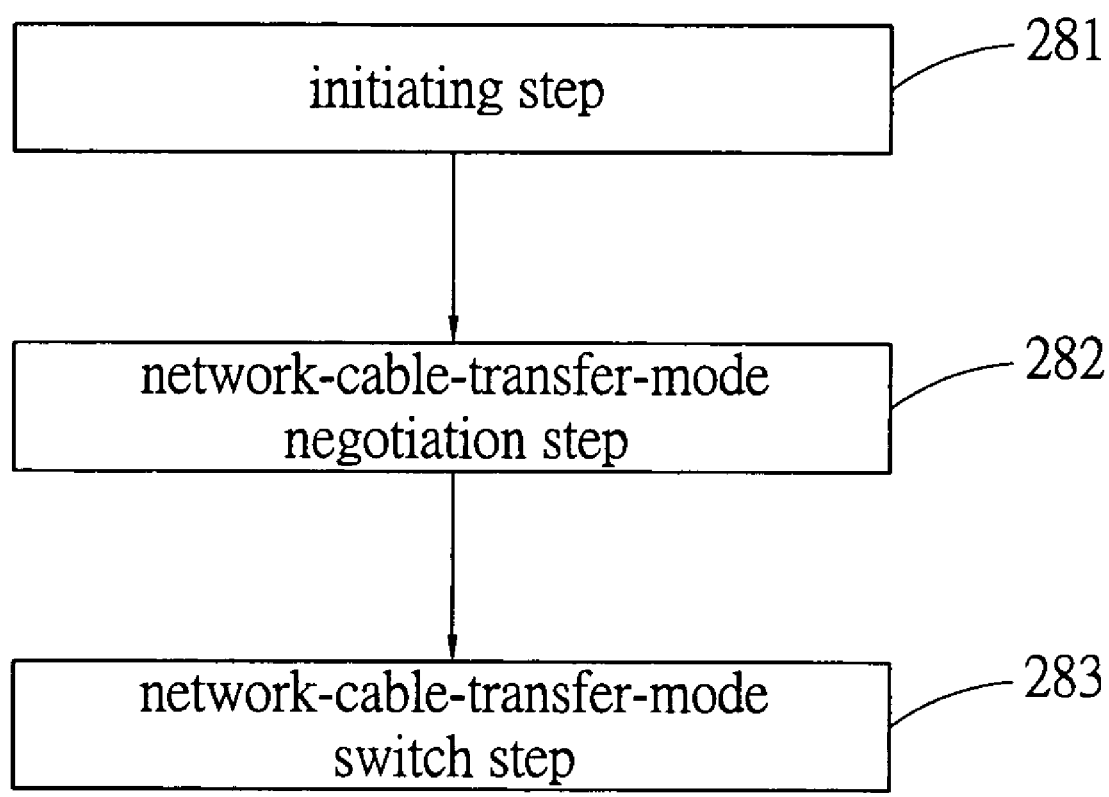
FIG. 2C is a flowchart illustrating the detailed steps of step 280B in FIG. 2B.

Detail steps of step 280B are further illustrated in FIG. 2C as follows: Initially, the negotiating-transforming process is initiated at step 281; then the network cable transfer mode for data transfer is negotiated at step 282 by the network apparatus comprising the provided network interface card and the target network apparatus; finally, the one-way/two-way network cable transfer mode switch is performed at step 283.

It should be noticed that step 260 and step 270 in this embodiment are necessary only in the beginning stage of the whole data transfer process. In other words, the present invention can also perform a real-time network cable transfer mode switch in the data transfer process wherever it is suggested, and in which case the steps 260 and 270 are not necessary steps.

Figure 3A:
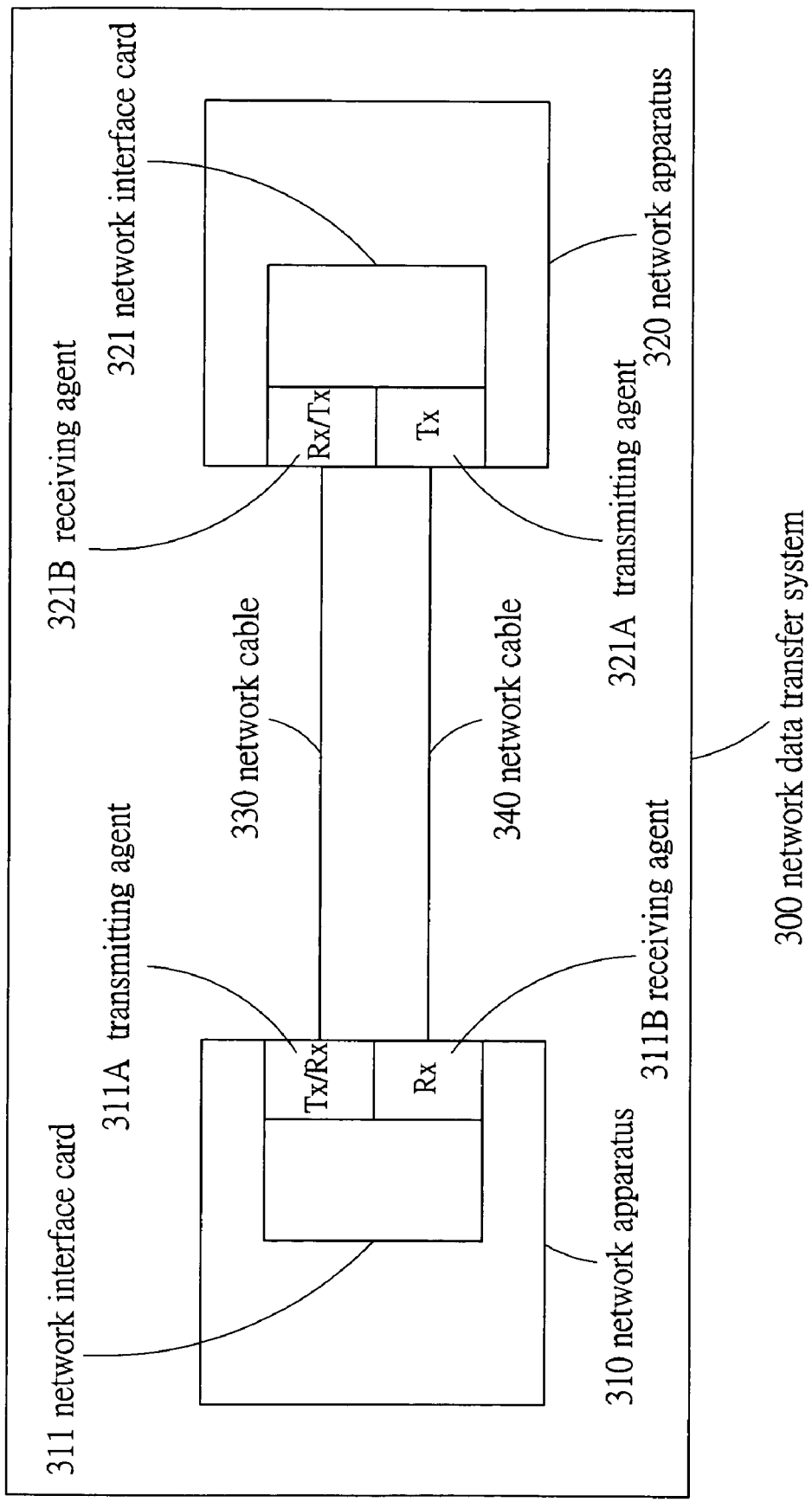
FIG. 3A is a block diagram illustrating a network data transfer system in accordance with the second embodiment of the present invention.

Reference is now made to FIG. 3A, which is a block diagram illustrating a network data transfer system 300 in accordance with a second embodiment. The network data transfer system 300 comprises numerous network apparatuses 310/320, wherein each of the network apparatuses 310/320 can be a personal computer, a server, a switch or a hub. Detailed descriptions of the network apparatuses 310/320 will not be given herein since they are well-known elements. The network apparatus 310 comprise a network interface card 311 (which is new and not a well-known element) being capable of the one-way/two-way network cable transfer mode switch; the network interface card 311 further comprises a transmitting agent 311A and a receiving agent 311B. The network apparatus 320 comprise a network interface card 321 being capable of the one-way/two-way network cable transfer mode switch; the network interface card 321 further comprises a transmitting agent 321A and a receiving agent 321B. The transmitting agent 311A is electrically coupled with the receiving agent 321B by a network cable 330 to enable transfer of packets between the transmitting agent 311A and the receiving agent 321B; the transmitting agent 321A is electrically coupled with the receiving agent 311B by a network cable 340 to enable transfer of packets between the transmitting agent 321A and the receiving agent 311B.

Referring to FIG. 3A, in this embodiment, the network interface cards 311 and 321 are technically equal to the network interface card 200 in the first embodiment of the present invention in that they are all capable of the one-way/two-way network cable transfer mode switch. In this embodiment, the network interface cards 311 and 321 negotiate with each other for the network cable transfer mode for data transfer and perform the network cable transfer mode switch to turn the function of the transmitting agent 311A from the original packet-transmitting into simultaneous packet-transmitting and packet-receiving, and to turn the function of the receiving agent 321B from the original packet-receiving into simultaneous packet-receiving and packet-transmitting. This enables, for example, the transmitting agent 311A to receive packets from the receiving agent 321B while transmitting packets to the receiving agent 321B. At a very top level, in the network data transfer system 300, the transfer bandwidth in the direction from the network apparatus 320 to the network apparatus 310 is the whole physical bandwidth of the network cable 340 plus part of the physical bandwidth of the network cable 330; the transfer bandwidth in the direction from the network apparatus 310 to the network apparatus 320 is merely part of the physical bandwidth of the network cable 330. Obviously, in this embodiment, the network data transfer system 300 utilizes a larger bandwidth for data transfer in the direction from the network apparatus 320 to the network apparatus 310 than that from the network apparatus 310 to the network apparatus 320. In other words, the network data transfer system 300 executes data transfer utilizing an asymmetric transfer mechanism. Therefore, the network data transfer system 300 in this embodiment can, when the transfer rate (loading) in the direction from the network apparatus 320 to the network apparatus 310 is larger than that from the network apparatus 310 to the network apparatus 320, overcome the above-mentioned improper bandwidth allocation problem caused by the symmetry feature of the conventional Ethernet, and utilize proper bandwidths to execute data transfer.

Of course, as can be understood by those skilled in the art, when the transfer rate (loading) in the direction from the network apparatus 310 to the network apparatus 320 is larger than that from the network apparatus 320 to the network apparatus 310, the network data transfer system 300 can execute the same data transfer in the reverse direction where the transmitting and receiving agents are interchanged.

Figure 3B:
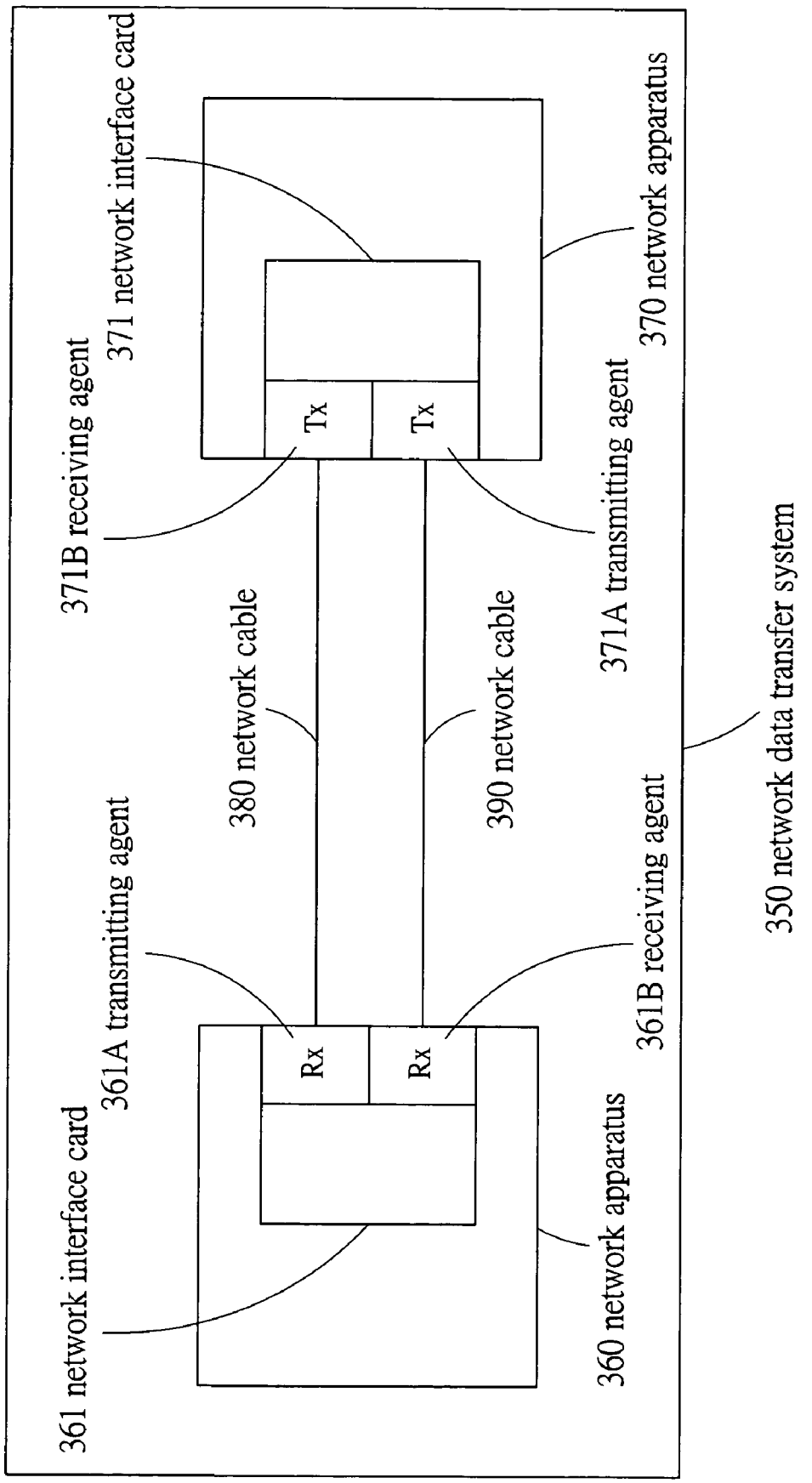
FIG. 3B is a block diagram illustrating a network data transfer system in accordance with the third embodiment of the present invention.

Reference is now made to FIG. 3B, which is a block diagram illustrating a network data transfer system 350 in accordance with a third embodiment of the present invention. The network data transfer system 350 comprises numerous network apparatuses 360/370, wherein each of the network apparatuses 360/370 can be a personal computer, a server, a switch or a hub. Detailed descriptions of the network apparatuses 360/370 will not be given herein since they are well-known elements. The network apparatus 360 comprises a network interface card 361 (which is new and not a well-known element) being capable of the one-way/two-way network cable transfer mode switch; the network interface card 361 further comprises a transmitting agent 361A and a receiving agent 361B. The network apparatus 370 comprises a network interface card 371 being capable of the one-way/two-way network cable transfer mode switch; the network interface card 371 further comprises a transmitting agent 371A and a receiving agent 371B. The transmitting agent 361A is electrically coupled with the receiving agent 371B by a network cable 380 to enable transfer of packets between the transmitting agent 361A and the receiving agent 371B; the transmitting agent 371A is electrically coupled with the receiving agent 361B by a network cable 390 to enable transfer of packets between the transmitting agent 371A and the receiving agent 361B.

Referring to FIG. 3B, in this embodiment, the network interface cards 361/371 are technically equal to the network interface card 200 in the first embodiment of the present invention in that they all are capable of the one-way/two-way network cable transfer mode switch. In this embodiment, the network interface cards 361/371 negotiate with each other for the network cable transfer mode for data transfer and perform the network cable transfer mode switch to turn the function of the transmitting agent 361A from the original packet-transmitting into packet-receiving, and to turn the function of the receiving agent 371B from the original packet-receiving into packet-transmitting. At a very top level, the direction of data transfer in the network data transfer system 350 is completely from the network apparatus 370 to the network apparatus 360, and the transfer bandwidth could be summarization of the whole physical bandwidth of both the network cables 380 and 390. Therefore, the network data transfer system 350 in this embodiment can, when only data transfer in the direction from the network apparatus 370 to the network apparatus 360 is required, overcome the above-mentioned improper bandwidth allocation problem caused by the symmetry feature of the conventional Ethernet, and provide a larger bandwidth for data transfer with a theoretically maximal magnifying factor of 2.

Of course, as can be understood by those skilled in the art, when only data transfer in the direction from the network apparatus 360 to the network apparatus 370 is required, the network data transfer system 350 can execute the same data transfer in the reverse direction where the transmitting and receiving agents are interchanged.

Figure 4:
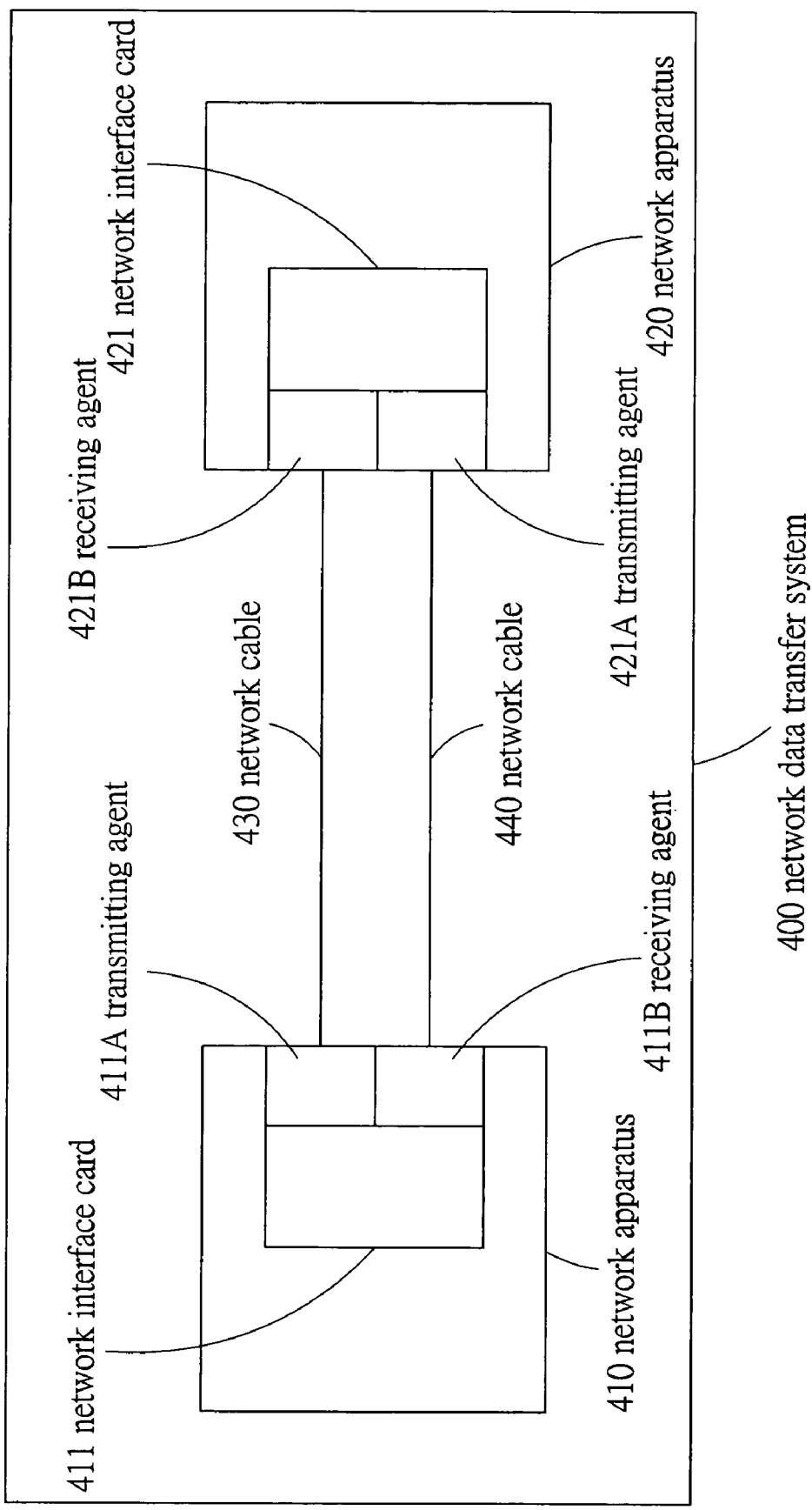
FIG. 4 is a block diagram illustrating a network data transfer system in accordance with the fourth embodiment of the present invention.

Reference is now made to FIG. 4, which is a block diagram illustrating a network data transfer system 400 in accordance with a fourth embodiment of the present invention. The network data transfer system 400 comprises numerous network apparatuses 410/420, wherein each of the network apparatuses 410/420 can be a personal computer, a server, a switch or a hub. Detailed descriptions of the network apparatuses 410/420 will not be given herein since they are well-known elements. The network apparatus 410 comprises a network interface card 411 (which is new and not a well-known element) being capable of the one-way/two-way network cable transfer mode switch; the network interface card 411 further comprises a transmitting agent 411A and a receiving agent 411B. The network apparatus 420 comprise a conventional network interface card 421 which is not capable of the one-way/two-way network cable transfer mode switch; the network interface card 421 further comprises a transmitting agent 421A and a receiving agent 421B. The transmitting agent 411A is electrically coupled with the receiving agent 421B by a network cable 430 to enable transfer of packets from the transmitting agent 411A to the receiving agent 421B; the transmitting agent 421A is electrically coupled with the receiving agent 411B by a network cable 440 to enable transfer of packets from the transmitting agent 421A to the receiving agent 411B.

Referring to FIG. 4, in this embodiment, the network interface card 411 is technically equal to the network interface card 200 in the first embodiment in that they are both capable of the one-way/two-way network cable transfer mode switch. However, since the network interface card 421 is a conventional network interface card and is not capable of the one-way/two-way network cable transfer mode, the network apparatus 420 can not co-operate with the network apparatus 410 to form a data transfer system utilizing an asymmetric data-transfer mechanism. On the contrary, the network apparatuses 410 and 420 execute data transfer utilizing the default network cable transfer mode settings of the network interface cards 411 and 421.

Therefore, at a very top level, in the data transfer system 400 the directions of data transfer are respectively from the transmitting agent 411A via the network cable 430 to the receiving agent 421B and from the transmitting agent 421A via the network cable 440 to the receiving agent 411B. In addition, the bandwidths used for data transfer are respectively the whole physical bandwidth of the network cables 430 or 440. In other words, the data transfer system 400 executes data transfer utilizing a symmetric data-transfer mechanism, the same as that used in the conventional Ethernet.

Accordingly, in the network data transfer system 400, even if the network interface card of the target network apparatus (such as the network apparatus 420) is not capable of the one-way/two-way network cable transfer mode switch, the network interface card 411 provided by the present invention still can correctly execute data transfer via co-operation with the network interface card 421 utilizing the default network cable transfer mode setting, i.e. the one-way transfer mode which is the same as that used in the conventional Ethernet. Therefore, the present invention can be directly integrated into the current Ethernet network system without additional modifications in current hardware and/or software. This allows improvements in data transfer efficiency with low extra construction cost.

However, it should be noticed, to ensure the switching function of the present invention be correctly executed, at least one of the network cables 330 and 340 and at least one of the network cables 380 and 390 must support two-way data transfer. For example, the common copper twisted pair Cat 5 is capable of two-way data transfer, while the optical fiber isn't.

Accordingly, the present invention provides an asymmetric network data transfer system to overcome the improper bandwidth allocation problem caused by the symmetry feature of the Ethernet by real-time switches between symmetric and asymmetric data transfer mechanisms, and through which to allow a better transfer bandwidth allocation and improvements in data transfer efficiency.

Obviously, many modifications and variations of the present invention are possible in light of the above teachings. It is therefore to be understood that within the scope of the appended claims, the present invention may be practiced otherwise than as specifically described herein. Although specific embodiments have been illustrated and described, it will be obvious to those skilled in the art that various modifications may be made without departing from what is intended to be limited solely by the appended claims.

What is claimed is:

1. An Ethernet network interface card being capable of an automatic transfer mode switch, comprising:
   a detecting module to detect the network condition and generate a detecting result; and
   a deciding/switching module to decide a network cable transfer mode according to said detecting result, wherein if said detecting result shows that a two-way network cable transfer mode for data transfer is needed under said network condition, said deciding/switching module performs a one-way/two-way network transfer mode switch process;
   wherein if said detecting result shows that said two-way network cable transfer mode for data transfer is not needed under said network condition, said deciding/switching module does not perform said one-way/two-way network transfer mode switch process.

2. The Ethernet network interface card of claim 1, further comprising:
   a negotiating module to negotiate with a target network apparatus for a packet format for data transmission;
   a transforming module to perform the transformation between the digital data and the packets according to said packet format; and
   a transmitting/receiving module to transmit and receive packets utilizing said network cable transfer mode.

3. The Ethernet network interface card of claim 2, wherein said transmitting/receiving module further comprises a transmitting agent, the action performed by said transmitting agent being chosen from the group consisting of the following:
   transmitting packets when said deciding/switching module does not perform said one-way/two-way network cable transfer mode switch process;
   transmitting and receiving packets simultaneously when said deciding/switching module performs said one-way/two-way network cable transfer mode switch process; and
   receiving packets when said deciding/switching module performs said one-way/two-way network cable transfer mode switch process.

4. The Ethernet network interface card of claim 2, wherein said transmitting/receiving module further comprises a receiving agent, the action performed by said receiving agent being chosen from the group consisting of the following:
   receiving packets when said deciding/switching module does not perform said one-way/two-way network cable transfer mode switch process;
   receiving and transmitting packets simultaneously when said deciding/switching module performs said one-way/two-way network cable transfer mode switch process; and
   transmitting packets when said deciding/switching module performs said one-way/two-way network cable transfer mode switch process.

5. The Ethernet network interface card of claim 1, wherein the judging criterion utilized to decide whether to perform said one-way/two-way network cable transfer mode switch process is chosen from the group consisting of the following conditions:
   the receipt rate of said Ethernet network interface card induces the data-receiving network cable to arrive the upper transfer loading limit of the data-receiving network cable;
   the receipt rate of said Ethernet network interface card exceeds a first specific proportion of the upper transfer loading limit of the data-receiving network cable;
   the transmittal rate of said Ethernet network interface card induces the data-transmitting network cable to arrive the upper transfer loading limit of the data-transmitting network cable; and
   the transmittal rate of said Ethernet card exceeds a second specific proportion of the upper transfer loading limit of the data-transmitting network cable.

6. The Ethernet network interface card of claim 5, wherein each of said specific proportions is an adjustable parameter, moreover, the value of said first specific proportion being independent from the value of said second specific proportion.

7. A network data transfer method, comprising:
   executing a negotiating process to decide a packet format for data transfer;
   executing a transforming process to perform the transformation between the digital data and the packets;
   executing a detecting process to detect the network condition and generate a detecting result; and
   executing a deciding process to decide a network cable transfer mode according to said detecting result, wherein said deciding process comprises a one-way/two-way network cable transfer mode switch process.

8. The network data transfer method of claim 7, wherein said network data transfer method is implemented by a network apparatus comprising an Ethernet network interface card being capable of an automatic transfer mode switch and a target network apparatus being capable of said automatic transfer mode switch.

9. The network data transfer method of claim 7, wherein said automatic transfer mode switch is performed when said detecting result suggests so, and data transfer is then executed utilizing a two-way network cable transfer mode.

10. The network data transfer method of claim 7, wherein said automatic transfer mode switch is not performed when said detecting result does not suggest so, and data transfer is then executed in a one-way network cable transfer mode.

11. The network data transfer method of claim 7, wherein the judging criterion utilized to decide whether to perform said one-way/two-way network cable transfer mode switch process is chosen form the group consisting of the following conditions:
   the receipt rate of said Ethernet network interface card induces the data-receiving network cable to arrive the upper transfer loading limit of the data-receiving network cable;
   the receipt rate of said Ethernet network interface card exceeds a first specific proportion of the upper transfer loading limit of the data-receiving network cable;
   the transmittal rate of said Ethernet network interface card induces the data-transmitting network cable to arrive the upper transfer loading limit of the data-transmitting network cable; and
   the transmittal rate of said Ethernet card exceeds a second specific proportion of the upper transfer loading limit of the data-transmitting network cable.

12. The network data transfer method of claim 11, wherein each of said specific proportions is an adjustable parameter, and the value of said first specific proportion is independent from the value of said second specific proportion.

13. A network data transfer system, comprising:
   a first network apparatus comprising an Ethernet network interface card being capable of an automatic transfer mode switch, wherein the Ethernet interface card comprises:
      a detecting module to detect the network condition and generate a detecting result; and a deciding/switching module to decide a network cable transfer mode according to said detecting result, if said detecting result showing that a two-way network cable transfer mode for data transfer is needed under said network condition, said deciding/switching module performing a one-way/two-way network transfer mode switch process;

moreover, if said detecting result showing that said two-way network cable transfer mode for data transfer is not needed under said network condition, said deciding/switching module does not perform said one-way/two-way network transfer mode switch process; and a second network apparatus which is connected with said first network apparatus.

14. The network data transfer system of claim 13, further comprising:

a negotiating module to negotiate with a target network apparatus for a packet format for data transfer;

a transforming module to perform the transformation between the digital data and the packets according to said packet format; and a transmitting/receiving module to transmit and receive packets utilizing said network cable transfer mode.

15. The network data transfer system of claim 14, wherein said transmitting/receiving module further comprises a transmitting agent, the action performed by said transmitting agent being chosen from the group consisting of the following:

transmitting packets when said deciding/switching module does not perform said one-way/two-way network cable transfer mode switch process;

transmitting and receiving packets simultaneously when said deciding/switching module performs said one-way/two-way network cable transfer mode switch process; and receiving packets when said deciding/switching module performs said one-way/two-way network cable transfer mode switch process.

16. The network data transfer system of claim 14, wherein said transmitting/receiving module further comprises a receiving agent, the action performed by said receiving agent being chosen from the group consisting of the following:

receiving packets when said deciding/switching module does not perform said one-way/two-way network cable transfer mode switch process;

receiving and transmitting packets simultaneously when said deciding/switching module performs said one-way/two-way network cable transfer mode switch process; and transmitting packets when said deciding/switching module performs said one-way/two-way network cable transfer mode switch process.

17. The network data transfer system of claim 14, wherein the judging criterion utilized to decide whether to perform said one-way/two-way network cable transfer mode switch process or not is chosen from the group consisting of the following conditions:

the receipt rate of said Ethernet network interface card induces the data-receiving network cable to arrive the upper transfer loading limit of the data-receiving network cable;

the receipt rate of said Ethernet network interface card exceeds a first specific proportion of the upper transfer loading limit of the data-receiving network cable;

the transmittal rate of said Ethernet network interface card induces the data-transmitting network cable to arrive the upper transfer loading limit of the data-transmitting network cable; and the transmittal rate of said Ethernet network interface card exceeds a second specific proportion of the upper transfer loading limit of the data-transmitting network cable;

wherein each of said specific proportions is an adjustable parameter, and the value of said first specific proportion is independent from the value of said second specific proportion.

18. The network data transfer system of claim 13, wherein said second network apparatus further comprises an Ethernet network interface card being capable of an automatic transfer mode switch.

19. The network data transfer system of claim 18, wherein the way said first network apparatus and second network apparatus co-operate with each other is chosen from the group consisting of the followings:

transmitting and receiving packets utilizing asymmetric transfer bandwidths by said Ethernet network interface card being capable of an automatic transfer mode switch; and transmitting and receiving packets utilizing symmetric transfer bandwidths.

* * * * *